United States Patent [19]

Reese

[11] 4,443,251

[45] Apr. 17, 1984

[54] METHOD OF OPERATING A BLAST FURNACE

[76] Inventor: Theodore J. Reese, P.O. Box 770, Michigan City, Ind. 46360

[21] Appl. No.: 430,984

[22] Filed: Sep. 30, 1982

Related U.S. Application Data

[63] Continuation-in-part of Ser. No. 313,733, Oct. 22, 1981, abandoned.

[51] Int. Cl.³ .............................................. C21B 5/00
[52] U.S. Cl. ..................................................... 75/42
[58] Field of Search ...................................... 75/41, 42

[56] References Cited

FOREIGN PATENT DOCUMENTS 2935544  3/1981  Fed. Rep. of Germany .......... 75/42

OTHER PUBLICATIONS

WO 81/03668 Dec. 24, 1981 PCT Published Internation Application.

*Primary Examiner*—M. J. Andrews
*Attorney, Agent, or Firm*—Ostrolenk, Faber, Gerb & Soffen

[57] ABSTRACT

A method of operating a blast furnace wherein a fluid combustible waste material and oxygen are introduced into the lower part of the furnace during operation thereof.

12 Claims, 1 Drawing Figure

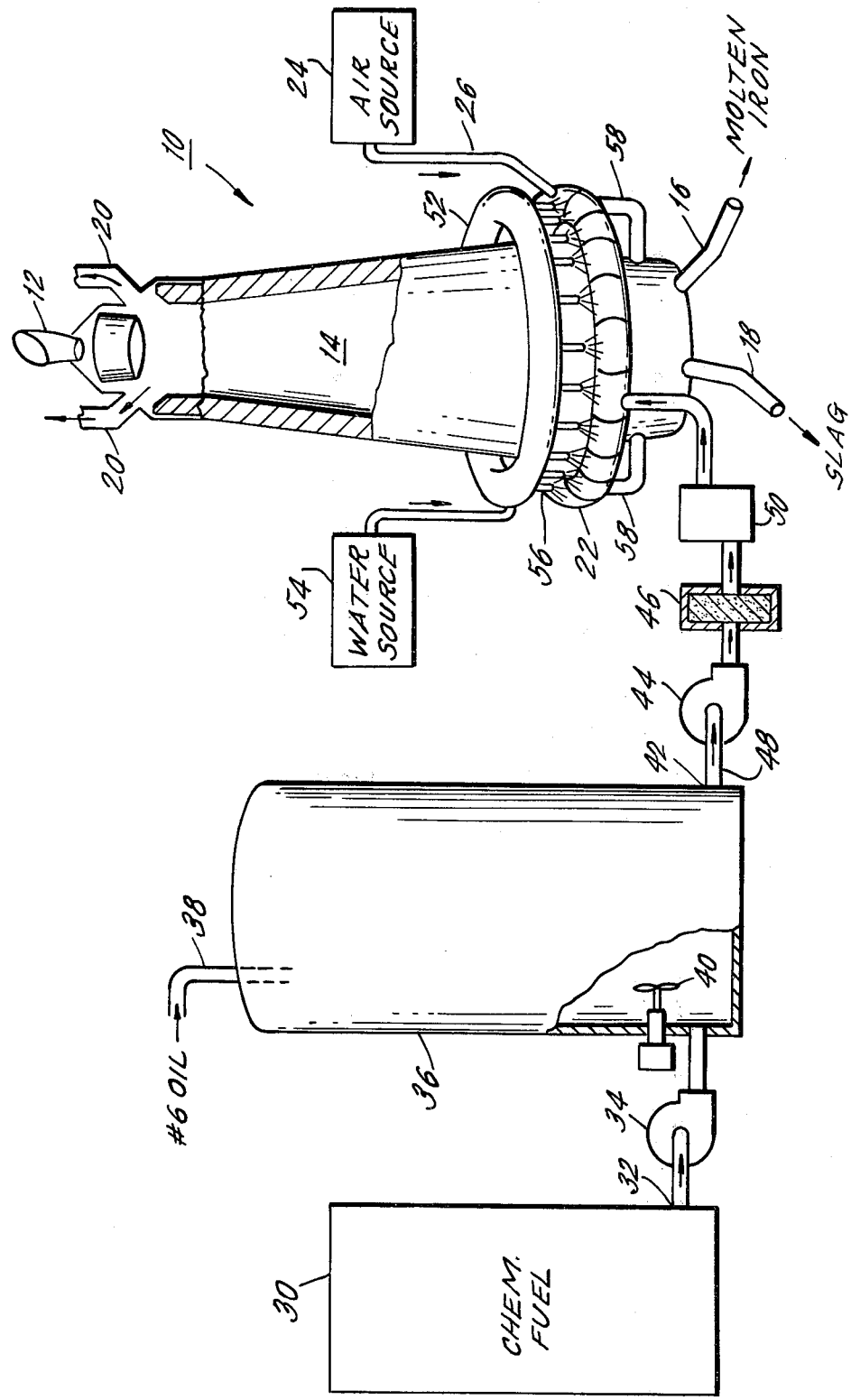

METHOD OF OPERATING A BLAST FURNACE

BACKGROUND OF THE INVENTION

This is a continuation-in-part of application Ser. No. 313,733 filed Oct. 22, 1981 now abandoned.

This invention relates to improvements in method of operating a blast furnace.

The method of operating a blast furnace conventionally employed for a number of years has not substantially varied. Conventional blast furnace operation entails supply to the furnace of ore, fuel, limestone and air in a manner to cause iron oxide ore to react with carbon to produce carbon dioxide gas, iron metal and slag. The carbon and iron oxide move downwardly in a top-filled furnace while air moves upwardly therein. The carbon employed is usually in the form of coke which is burned to heat the ore and other furnace contents and which assists in reducing the iron oxide ore to metal. Lime is charged into the furnace, as a fluxing agent, usually in the form of limestone. Carbon dioxide is removed from the top of the furnace during the operation and molten iron and slag are tapped from the bottom. Usually the slag is composed of aluminate and silicate minerals from iron ore which have reacted with lime. The conventional design of a furnace and the composition of the charge therein conventionally is such that all of the iron oxide is reduced to iron before liquid slag is formed so as to avoid melting of iron in the slag and avoid a decrease in the output of metallic iron from the furnace. To improve furnace operation, fuel oil is commonly introduced into the furnace.

The operation of a blast furnace at optimum condition depends upon various factors, such as the proper ratio or proportion of the basic materials, the character and constituents of the materials, i.e., the character and constituents of the ore, coke and limestone. Obviously optimum operating conditions, when the constituents employed vary from time to time, result in variations in operating costs, the extent of molten iron recovered and other operating factors.

U.S. Pat. No. 3,179,513, teaches the introduction into a blast furnace under pressure, with oxygen, of a powdered metal such as aluminum, zinc, tin, zirconium and titanium coated with a stearate along with powdered coal and a liquid hydrocarbon and may be in the form of a slurry. U.S. Pat. No. 3,228,764 injects fuel and air into the blast furnace and the fuel may be in the form of a petroleum distillate including various additives such as corrosion inhibitors, viscosity index improvers, detergents, slug inhibitors and the like. A method of manufacturing reducing gas by thermally decomposing a hydrocarbon source is disclosed in U.S. Pat. No. 3,909,446 which also teaches that there are methods for manufacturing fuel oil by decomposing high molecular weight hydrocarbons such as plastic scraps with steam.

U.S. Pat. No. 4,175,949 describes the disposal of worn out rubber tires by feeding them to a blast furnace, U.S. Pat. No. 4,078,914 proposes the use of various types of refuse, trash and garbage in the presence of coke in a vertical shaft furnace and U.S. Pat. No. 4,188,205 injects a liquid water-hydrocarbon fuel containing a metallic element and emulsifying agent into a blast furnace.

German Patent Applications Nos. 29-35-544 and 29-23-726 proposes the use of dry activated sludge which may contain up to 50% carbon and other carbonaceous waste materials such as used paper, straw, lignin, wood, plastic and rubber wastes to be introduced into a continuous blast furnace replacing an equal amount of oil or coke.

A new method has been discovered which produces an improvement in operating results such as the cost of operation by the use of certain materials not presently utilized in blast furnace operations. These materials can be more economical than materials heretofore commonly employed and advantageously include combustible materials which are produced as waste products of other manufacturing processes. Accordingly, the new invention is also advantageous from an environmental point of view by providing an answer to a waste disposal problem. The new material dramatically improves the atomization characteristics of fuels injected into the blast furnace which provides numerous benefits, the primary advantage being very rapid and complete conversion of all of the available hydrocarbons in the injection mixture so that a maximum amount of carbon is released from the injected fuel for reduction of iron oxide and this has a positive economic impact on the total costs of reducing agents used in operating the furnace.

"Hanging" can occur in blast furnace operations which process ores containing high levels of alkaline materials as is very common. These minerals, principally sodium and potassium, tend to vaporize in the lower hotter regions of the furnace and then rise as vapor bubbles to the cooler regions higher in the furnace. When the vapors are sufficiently cooled, they condense, solidify and collect on the internal refractory walls of the furnace. Hanging is uniformly detrimental to furnace operations because it can result in a multitude of problems. For example, the "hanging" minerals can "slip" from the furnace walls and the chunk of material which breaks free can cause a thermal upset. If the "slipped" material is large enough, it is possible for sections of the refractory lining to be dislodged which, if serious enough, could cause a major shut-down. In the worst case, the "hanging" can continue over a period of time until the entire cross-section of the furnace becomes sealed off, which would be a catastrophic occurrence with disasterous effects. The new material used in the process of this invention chemically binds the alkaline materials into salts which become a part of the furnace slag thereby substantially reducing the possibility of hanging.

It is the object of this invention to provide a new method for operating a blast furnace which utilizes combustible waste materials from other manufacturing processes as a substitute for or as a supplement to other costlier materials now required for use, which facilitates removal of non-ferrous materials from the molten iron product, which increases the percentage of iron produced from a given amount of ore, which improves the atomization characteristics of the introduced fuels and which significantly reduces the problem of hanging. This and other objects of the invention will become apparent to those skilled in this art from the following detailed description in which the sole FIGURE is a schematic illustration of the invention.

DESCRIPTION OF THE INVENTION

Referring to the drawing which illustrates one embodiment of the invention, the numeral 10 designates a conventional vertically elongated blast furnace having conventional means 12 for discharging therein at the top thereof components such as iron ore, coke and limestone which constitute a charge 14 substantially filling the furnace during operation. The furnace is provided at its bottom with an outlet 16 for molten iron and an outlet 18 for slag. The furnace may be provided with outlets 20 adjacent to the upper end thereof for discharge of carbon dioxide created during the operation of the furnace.

A tuyere 22 encircles the furnace at its lower portion spaced above the iron outlet 16 and slag outlet 18. The tuyere 22 may be connected with a source 24 of compressed air, as by conduit 26. The tuyere 22 discharges into the lower portion of the furnace at a plurality of circumferentially spaced discharge points (not shown).

A container or other source 30 of combustible fluid waste material, herein designated "CHEM FUEL," is provided with a valved outlet 32 in which a pump 34, preferably of positive displacement type, is interposed. Outlet 32 discharges into the lower portion of a vertically elongated tank 36 into which also is discharged a valved conduit 38 connected to a source of fuel oil, (not shown) such as No. 6 oil. Within tank 36, preferably adjacent to the conduit 32 at one side of the lower part of the tank, is mounted an agitator 40. Agitator 40 is preferably constantly operated to circulate the contents of the tank 36 for vertical flow in a manner to effectively suspend the solids in the tank contents and to inhibit precipitation or sedimentation of solids or sludge within the tank. A valved outlet 42 extends from the lower portion of tank 36, preferably substantially opposite the supply line 32, and has interposed therein a positive displacement pump 44 and preferably discharges at and through a filter 46 by which large solid particles of combustible waste material are removed. A line or conduit 48 delivers the fluid combustible waste material which is passed through the pump 44 and filter 46 to the tuyere 22. A heat exchanger 50 is preferably interposed in the conduit 48 between the pump 44 and the tuyere 22. A plurality of lances or discharge jets (not shown) extend from the tuyere 22 and through the wall of the furnace to discharge contents of the tuyere into the furnace at substantially equally spaced locations.

An annular chamber 52 is preferably located above and adjacent to the tuyere 22. Water is supplied to chamber 52 from source 54 and a plurality of outlets 56 in chamber 52 discharge water onto the tuyere 22 in sprays at spaced points. Annular member 52 and tuyere 22 may be supported in selected positions encircling the furnace, as by supports 58.

The fluid combustible waste material, CHEM-FUEL, used in the present invention can contain pigments, resins and solvents which are discarded from and produced as by-products in the paint, plastics, chemicals and like industries and can include the so-called "still bottoms" from a solvent recovery plant. The waste products can include mixtures derived from different industries and are usually of the type which are discarded or destroyed, as by burning in a incinerator whose operation may require the use of scrubbers or precipitators for environmental protection. The waste material may include resins which constitute a source of carbon and can include pigments.

The fluid waste materials are, at 60° F. (ca. 15° C.), a low viscosity blend of thin pumpable liquid hydrocarbon solvents with suspended solids having a heat of combustion of 10,500 to about 19,500 BTU/lb, preferably 10,500–14,000 BTU/lb, a chlorine content of about 0.1–5% and substantially no free water, although there may be associated water present. The solvents will generally constitute 30 to 85% of the fluid material, preferably 65–75% and most preferably about 70%. The chlorine content provides chloride ions which react with alkaline materials normally present in the ore used in the blast furnace and chemically bind them into salts which then become a part of the furnace slag thereby minimizing "hanging".

The suspended solid particles in the fluid waste are of a size which will pass through a screen whose openings are substantially smaller than the smallest opening in the channels which the fluid waste traverses during its introduction into the furnace. The solid particles should pass through a screen whose openings are smaller than 50% of such smallest opening and preferably smaller than 15%. In many blast furnace operations, the smallest opening is a $\frac{1}{4}$ inch (ca. 0.6 cm) lance and in such case, it is preferred that the suspended particles pass through a 20 mesh screen which has a mesh opening of 0.0331 inch (ca. 0.08 cm).

The viscosity of the fluid waste material should be such that it passes through a #2 Zahn Cup in 12–25 seconds in the Zahn viscosity test at 70° F. (ca. 21° C.), and preferably passes through such cup in about 13–21 seconds. Preferably the viscosity is not greater than No. 4 fuel oil. The fluid waste material is rated flammable under U.S. Department of Transportation Standards.

The fluid waste material preferably causes none to slight corrosion of carbon steel, has substantially no sulfur content, a heavy metal content of less than about 0.3% and an ash content of about 10% or less.

In the normal operation of a blast furnace, the iron or, coke and limestone are periodically delivered or discharged into the upper end of the furnace in which combustion of the coke melts the iron ore. At an intermediate point in the height of the blast furnace, and preferably near the bottom thereof, tuyeres encircle the furnace and discharge hot air into the furnace sometimes mixed with fuel oil to facilitate and support combustion within the furnace. The ore, coke and limestone gradually lower in the furnace incident to the combustion therein to produce molten iron ore which is discharged at one point, such as 16, at the bottom of the furnace, and also to produce slag which is discharged at the second point 18 at the bottom of the furnace.

In accordance with the present invention, there is delivered or discharged into the lower portion of the furnace, in addition to compressed air, the fluid combustible waste materials as above described, with or without fuel oil as determined by the characteristics of the waste material. The proportions of fuel oil and fluid combustible waste material which can be utilized can range from 100% combustible waste material to about 15% or less of combustible waste material depending upon various factors such as the availability and characteristics of the combustible waste material and the viscosity of the mixture of waste material and fuel oil required to ensure free flow thereof from the supply source to the furnace and to permit the discharge thereof into the furnace under pressure. Preferably the combustible waste materials are about 40–80% of the mixture. Normally the fuel oil from tank 36 is heated to, for example, 180° F. (ca. 82° C.) by heat exchanger 50 to facilitate its delivery to the furnace. As the percentage of combustible waste material in the mixture increases, the temperature to which the fuel oil is heated can be proportionally reduced. In some cases, it is found that about 40% or more liquid combustible waste mixture with fuel oil can be delivered to the furnace 10 at ambient temperature. The use of the waste material substantially reduces the quantity of fuel oil normally required for blast furnace operation and can act in whole or in part as a substitute for the oil with reference to the required hydrocarbons to support combustion within the furnace and to promote and ensure, in combination with combustion of the coke of the charge, the melting of the iron and the formation of the fluid slag from impurities of the ore. The pressure at which the waste material, or the mixture of waste material and fuel oil, is discharged into the blast furnace will be chosen to ensure that the same can be injected into the contents of the lower part of the furnace at the desired rate. Such pressures can vary from 30-150 psi (ca. 2-10.5 kg/cm$^2$) but are preferably on the order of about 100 psi (7 kg/cm$^2$). The use of the fluid combustible waste material and the operation of a blast furnace produces a result different from the results of prior dispositions of the waste material and constitutes a substitute for or a supplement to other more costly materials such as coke and fuel oil normally required in blast furnace operations. To the extent there are metal components in the combustible waste material, they serve a purpose substantially similar to the purpose now conventionally served by limestone when introduced into a blast furnace, i.e., of facilitating removal of non-ferrous minerals from the blast furnace charge of ore.

A result of the practice of this method which is surprising to and unexpected by people skilled in the art is that the use of the fluid combustible waste material increases the rate of molten iron production in the blast furnace. Thus, the improved method produces two distinct beneficial results: (1) increase of the percentage of production of molten iron from iron oxide, and (2) the use of comparatively inexpensive materials as a substitute for or supplement to costly materials such as coke and fuel oil normally required in blast furnace operation. A further advantage of the method is that the combustible waste material is utilized productively so that the expense and problems of prior practices of disposing of the combustible waste material is reduced or eliminated.

An important consideration in evaluating the improved process is that the resins contained in the combustible waste materials provide an additional source of carbon so as to enhance reduction of iron and increase the rate of iron recovered in the furnace. Pigments contained in combustible waste material serve a purpose similar to limestone in a blast furnace, in that they tie up impurities contained in the ore. The solvents contained in the combustible waste material act to hold the resins and the pigments in suspension so as to facilitate their handling and discharge into the blast furnace. In other words, the solvent maintains the fluidity and viscosity of the combustible waste material from the point of collection or generation thereof to the point of discharge at the blast furnace. The solvents also provide an additional source of carbon necessary in blast furnace operation to reduce iron oxide.

One of the novel characteristics of the method is the use of waste material wherein pigments or resins are used in ranges of 35% to 50% or more, preferably in the range of 25% to 35%, when mixed in solvents. Such percentages of pigments and resins are substantially greater than the percentages which can be used in prevailing methods of destruction of waste material. Hence, this new method reduces the cost of blast furnace operation, reduces the previously necessary expenses of disposal of combustible waste materials, and permits conversion of waste materials into slag which can be handled easily and safely. The slag, in turn, can be converted into beneficial products, such as aggregates used in concrete in paving roads.

The synthetic resins which are commonly present in waste materials usable in this process include alkyds, acrylics, polyvinyl acetate, epoxy resins, phenolics and urethanes. The pigments which are commonly present in waste materials include titanium dioxide, zinc oxide, calcium carbonate, talc or magnesium silicate and aluminum silicate. Drying oils commonly found in waste materials usable in the process include linseed oil, soy bean oil, tall oil, tung oil, safflower oil and castor oil. Solvents commonly present in combustible waste material usable in the process include aromatics such as toluenes, xylenes and naphtha, alcohols such as methanol, ethyl alcohol and isopropyl alcohol, alyphatic hydrocarbons such as n-butane, glycols, ketones, esters, ethers, glycol-ethers, and the like. The foregoing components can occur in different proportions depending upon the source of the waste material, and are not critical as long as combustibility thereof occurs and the waste material is sufficiently fluid to permit practice of the method as heretofore described.

Various changes and modifications can be made in the process of the present invention without departing from the spirit and scope thereof. The various embodiments which have been described herein were for the purpose of further illustrating the present invention and were not intended to limit it. It will be appreciated that unless otherwise specified, all parts and percentages set forth herein are by weight.

What is claimed is:

1. In a method of operating a blast furnace to melt therein iron ore mixed with coke and limestone to produce and discharge molten iron and slag at the bottom of the furnace, and to discharge carbon dioxide at the top of the furnace, the improvement which comprises the step of introducing into the lower portion of the furnace under pressure a fluid combustible waste material and oxygen wherein said waste material comprises a pumpable low viscosity suspension of solids in liquid hydrocarbons having a heat of combustion of 10,500 to about 19,500 BTU per pound, a chlorine content of about 0.1-5% and substantially no free water.

2. The method of claim 1 wherein the suspended solid particles are of a size which pass through a screen whose openings are smaller than 50% of the smallest opening in the delivery channels that the combustible waste materials will traverse in being introduced into the furnace.

3. The method of claim 2 wherein the combustible waste material has a heat of combustion of 10,500-14,000 BTU per pound, a chlorine content of about 2.5-5% and the suspended particles are of a size to pass through a screen whose openings are smaller than 15% of the smallest opening in the delivery channels.

4. The method of claim 3 wherein said combustible fluid waste has a #2 Zahn Cup viscosity at 70° F. of about 12-25 seconds.

5. The method of claim 4 wherein said fluid combustible waste material has a #2 Zahn Cup viscosity of about 13-21 seconds, a heavy metal content of less than about 0.3% and an ash content not greater than about 10%.

6. The method of claim 5 wherein said fluid combustible waste material is introduced into said furnace in admixture with fuel oil.

7. The method of claim 6 wherein said fluid combustible waste material comprises at least about 15% of said admixture.

8. The method of claim 7 wherein said combustible waste material comprises at least about 40% of said admixture.

9. The method of claim 8 wherein said admixture is discharged into said furnace under a pressure of about 30-150 psi.

10. The method of claim 9 wherein said pressure is about 100 psi.

11. The method of claim 10 wherein said fluid combustible waste material includes pigments and resins.

12. The method of claim 1 wherein said combustible waste material is introduced into the furnace at a rate to provide an amount of chlorine sufficient to decrease hanging therein.

* * * * *